United States Patent

[11] 3,545,464

| [72] | Inventor | David Morris Brown |
| | | Derby, England |
| [21] | Appl. No. | 776,625 |
| [22] | Filed | Nov. 18, 1968 |
| [45] | Patented | Dec. 8, 1970 |
| [73] | Assignee | Rolls-Royce Limited |
| | | Derby, Derbyshire, England |
| | | a British Company |
| | | Original application April 6, 1967, Ser. No. 628,902, now Patent No. 3,485,752, dated Dec. 23, 1969. Divided and this application Nov. 18, 1968, Ser. No. 776,625 |

[54] AIR INTAKE DUCT FOR A GAS TURBINE ENGINE
4 Claims, 1 Drawing Fig.

[52] U.S. Cl. .................................................. 137/15.1, 181/33
[51] Int. Cl. ...................................................... F02b 27/02, F02k 1/26, B64d 33/02
[50] Field of Search.......................................... 137/15.1, 15.2; 181/33.21

[56] References Cited
UNITED STATES PATENTS
| 2,944,764 | 7/1960 | Lane ........................ | 244/15 |
| 3,242,671 | 3/1966 | Moorehead ................. | 137/15.1 |

*Primary Examiner*—Alan Cohan
*Attorney*—Cushman, Darby & Cushman

ABSTRACT: An air inlet duct to selectively reduce downward transmission of compressor-generated noise or the like therefrom, the air inlet duct being for a gas turbine engine and at whose upstream end the bottom of the duct is extensible forwardly of the top thereof, thereby rendering the plane of the inlet of the duct oblique to the engine axis to reduce the noise by blocking the egress of noise transmitted downwards from the air inlet duct.

PATENTED DEC 8 1970
3,545,464
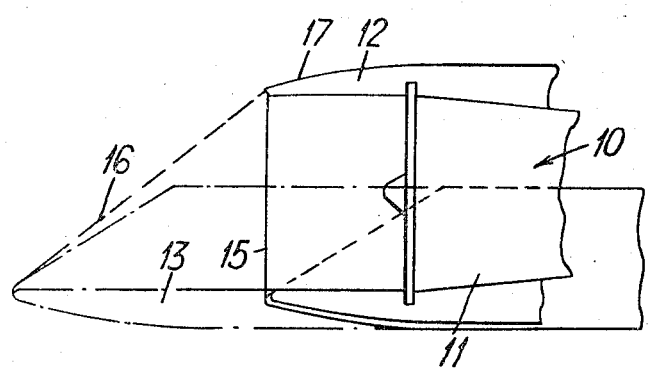
Inventor
DAVID MORRIS BROWN
By
Cushman, Darby + Cushman Attorneys

AIR INTAKE DUCT FOR A GAS TURBINE ENGINE

This application is a divisional application of my copending application Ser. No. 628,902 and filed April 6, 1967 now U.S. Pat. No. 3,485,252 issued Dec. 23, 1969.

This invention concerns an air intake duct for a gas turbine engine, the intake duct having an inlet lying in a plane which may be selectively changed to reduce compressor-generated noise or the like from the engine.

According to the present invention, there is provided an air intake duct for a gas turbine engine having a movable upstream end part and a fixed part, the movable part being slidably mounted from the fixed part for movement longitudinally of the duct between an inoperative position in which the inlet of the air intake duct lies in a plane making a first angle with the longitudinal axis of the duct and an operative position in which the bottom of the inlet is disposed forwardly of the top thereof and the inlet lies in a plane making a second angle with the said axis, the second angle being smaller than the first angle.

It is intended that the aforementioned first and second angles be measured from the duct axis in a counterclockwise direction.

Considerable engine noise, produced by the engine compressor, normally escapes through the air intake duct of a gas turbine engine. Since, by means of the present invention, the plane of the inlet of the air intake duct is, or may be rendered, oblique to the engine axis, this noise is attenuated so far as a person situated below the engine is concerned.

The said movable part may be movable into an inoperative position in which the said plane is at right angles to the engine axis. 4

The movable part may be disposed at the bottom of the duct and may also be part cylindrical in cross section.

The invention also comprises a gas turbine engine provided with an air intake duct as set forth above.

The invention is illustrated, merely by way of example, in the accompanying drawing which is a diagrammatic perspective view of an air intake duct for a gas turbine engine according to the present invention.

In the drawing there is shown a gas turbine engine 10 having a compressor 11 the air for which passes through an air intake duct 12.

Mounted below the main part of the air intake duct 12 is a slidable part of member 13 which is axially slidable (by means not shown) between an inoperative position in which its forward edge 14 is aligned with the upstream end of the main fixed upper part 17 of the air intake duct 12, and an operative position in which the said forward edge 14 is disposed forwardly thereof.

In the said inoperative position, the air intake duct 12 has its inlet disposed in a plane 15 which is at right angles to the duct axis which is also the engine axis. In the said operative position, however, the inlet of the air inlet duct 12 is in a plane 16 which is oblique to the duct axis.

Thus at takeoff and landing, the slidable member 13 is moved forwardly into the operative position shown in chain dotted lines so that it constitutes part of the bottom of the air intake duct 12 and extends forwardly of the top of the latter. The inlet of the air inlet duct 12 will then be in the plane 16 which is oblique to the engine axis, and the noise which normally escapes through the said inlet will therefore be substantially attenuated so far as a person vertically beneath the engine 10 is concerned. During flight, however, the slidable member 13 is retracted so that the inlet of the air inlet duct 12 lies in the plane 15 which is normal to the engine axis.

I claim:

1. An air intake duct to selectively reduce downward transmission of compressor-generated noise or the like therefrom of a gas turbine engine, said duct having an air inlet and comprising a movable upstream end part and a fixed part, said movable part being slidably mounted from the fixed part for movement longitudinally of the duct between an inoperative position in which the inlet of the air intake duct lies in a plane making a first angle with the longitudinal axis of the duct and an operative position in which the bottom of the inlet is disposed forwardly of the top thereof for reducing compressor-generated noise or the like and the inlet lying in a plane making a second angle with the said axis, the second angle being smaller than the first angle.

2. An air intake duct as claimed in claim 1 in which said movable part is disposed at the bottom of the duct.

3. an air intake duct as claimed in claim 2 wherein said movable part is part cylindrical in cross section.

4. An air intake duct as claimed in claim 1 in which said first angle is substantially 90°.

UNITED STATES PATENT OFFICE
CERTIFICATE OF CORRECTION

Patent No. __3,545,464__    Dated __December 8, 1970__

Inventor(s) __David Morris Brown__

It is certified that error appears in the above-identified patent and that said Letters Patent are hereby corrected as shown below:

[31]  18313/66

[32]  April 26, 1966

[33]  Great Britain

SIGNED AND
SEALED
MAR 9 1971

(SEAL)
Attest:

Edward M. Fletcher, Jr.
Attesting Officer

WILLIAM E. SCHUYLER, JR.
Commissioner of Patents